United States Patent
Gdovin et al.

[11] Patent Number: 6,134,044
[45] Date of Patent: Oct. 17, 2000

[54] PROJECTION SCREEN TO REPLACE A CRT DISPLAY FOR SIMULATION

[75] Inventors: David P. Gdovin, Vestal; David L. Peters, Whitney Point, both of N.Y.

[73] Assignee: Diamond Visionics Company, Vestal, N.Y.

[21] Appl. No.: 09/245,653

[22] Filed: Feb. 8, 1999

[51] Int. Cl.[7] .............................. G02B 26/00; G02B 9/34
[52] U.S. Cl. .................... 359/295; 359/293; 359/292; 359/771; 359/772
[58] Field of Search ............................ 359/771, 772, 359/295, 293, 292, 291

[56] References Cited

U.S. PATENT DOCUMENTS 5,600,383  2/1997  Hornbeck .................... 348/771
5,880,573  3/1999  Marshall ...................... 318/805

*Primary Examiner*—Hung Xuan Dang
*Assistant Examiner*—Michael A. Lucas
*Attorney, Agent, or Firm*—Malin, Haley & DiMaggio, P.A.

[57] ABSTRACT

A lightweight and low cost replacement display for a conventional cathode-ray tube (CRT) display is provided that projects distortion free digital images directly without conversion to analog signals. The display does not exhibit cross-talk interference when a plurality of displays are placed adjacent one another, and does not present large gaps between adjacent displays. The display utilizes a digital micromirror device that projects a 1:1 bit mapped digital signal to a plurality of micromirrors that are switchable between an on and an off state and projects the image of light reflected from the "on" mirrors onto a direct view screen.

2 Claims, 3 Drawing Sheets

PROJECTION SCREEN TO REPLACE A CRT DISPLAY FOR SIMULATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to projection display systems and more particularly to a projection display system that provides projection of distortion free analog and digital information and images on direct view displays without electromagnetic cross-talk interference between adjacent displays.

2. Description of Related Art

Conventional cathode-ray tube (CRT) monitors are presently utilized for projection of analog images for direct viewing. In many applications, including WAC window simulation environments, the direct view CRT monitors must be placed adjacent one another to provide a realistic view of the simulation environment or the desired projected image.

Conventional CRT displays and monitors are known in the art and generally utilize one or more electron beam generating guns, a focusing system, and a deflection system to project, focus, and steer a beam of electrons onto a display screen that is illuminated under electron bombardment. Typically, the CRT tube is somewhat funnel shaped and has a phosphor image surface or screen at the large end. The tube, sometimes referred to as the envelope, serves as a vacuum enclosure, and must provide for entry and deflection of the beam of electrons. Illumination resulting in color displays is well known and will not be described herein.

In many applications, multiple CRT displays are placed adjacent each other to create a larger projection image than can be projected by one display monitor alone with reasonable size and picture quality, or to project an image of shape that cannot reasonably be obtained by a single display monitor.

Many CRT monitors utilize magnetic deflection systems to steer the electron beam. When CRTs are placed adjacent each other the magnetic deflection systems as well as other electromagnetic emissions can cause interference between the adjacent CRTs, sometimes known as cross-talk, causing noise to appear in the display images.

CRTs tend to be large and heavy, partially because of the vacuum enclosure required, thereby creating an additional problem when placed adjacent each other. To create a large display made of individual CRTs, a sturdy framework must be constructed to hold the CRTs in place.

A further problem exists in that each CRT normally includes a framework to contain the tube and electronics. Therefore, CRTs can only be placed as close as the framework will allow. Even if a custom framework is designed to hold multiple CRTs as close as possible to each other, each CRT itself includes an outer area at the perimeter of the screen or front display area that is part of the thick vacuum container and does not illuminate. Therefore, there is a space between each adjacent CRT that cannot project an image and presents a series of gaps in the overall image as viewed on a combination of CRTs.

In many simulation applications, the operator views a series of CRT screens linked together visually to provide a 360 degree panoramic simulated view of the world surrounding the operator. One CRT is not large enough or physically configurable to provide such a view. For example, in a certain position, a military tank operator can view the terrain around the tank through a 360 degree, 6 inch high viewport in a portion of the tank. To simulate this 6 inch high view of the world, the simulation system must provide a series of CRTs, mounted side-by-side, 360 degrees, around the tank opening simulator. This requires a very sturdy framework, and as described above, will include a series of visual gaps between each adjacent display.

CRTs are analog devices and cannot display digital information directly. Computer generated images and other digital information must be converted to analog signals before being displayed on a CRT screen. In many systems, especially those systems operated by computer, all of the data is in digital form, and the conversion process from digital to analog signals occurring before display on a CRT screen can introduce noise to the original digital image, resulting in poor picture or display quality.

SUMMARY OF THE INVENTION

The present invention provides a projection display that is a 1:1 form, fit, and function replacement for a similarly sized conventional CRT display, that displays digital information directly, that exhibits no cross-talk interference with adjacent displays, is lightweight, and low cost.

The envelope of the present invention is similar to the CRT tube in that the envelope of the present invention houses the electronics, a special lens, and a special projection surface. However, the envelope of the present invention does not need to be a vacuum chamber as required for the envelope of a conventional CRT tube. The physical size of the envelope can be selected to be the same size as any CRT tube to be replaced.

Because the envelope of the present invention does not need to be a thick vacuum chamber, the viewing area on the projection surface can extend closer to the edge of the envelope. Adjacent displays therefore have a smaller gap between each other, which in one embodiment, can be approximately one half inch (½"). Without the thick vacuum chamber, the displays of the present invention are much lighter in comparison with a conventional CRT display, thereby reducing the requirements for a structural framework to hold the displays.

The electronics of the present display system can be housed within the envelope at the small end, and preferably incorporates digital light processing utilizing the digital micromirror device disclosed in U.S. Pat. Nos. 5,600,383, and 5,083,857 to Hornbeck, L. J., the disclosures of which are incorporated herein by reference, and that is available form Texas Instruments, Inc., Dallas, Tex., and which operates essentially as follows.

The digital micromirror device is a semiconductor light switch that consists of thousands of tiny square (approximately 16×16 $\mu$m for one example) mirrors, each mounted on a hinge atop a static random access memory (SRAM) . The hinges allow for each mirror to be tilted between +10 degrees and −10 degrees. Each mirror can switch a pixel of light from an "on" state, when the mirror is at +10 degrees, to an "off" state, when the mirror is at −10 degrees.

Light, which can be sent through condensing optics and a color filter, is reflected from the mirror surfaces that are "on", and typically pass through a projection lens to be projected onto a remote screen for viewing. The mirrors that are "off" will not reflect light back through the projection lens.

A typical micromirror device can have from 442,368 to 2.3 million mirrors, for example a 848×600 micromirror device will contain 508,800 tiltable mirrors.

Each pixel of digital image data is bit mapped in a 1:1 ratio directly to its own mirror providing exact digital control of the projected image. If the signal is 640×480 pixels, the central 640×480 mirrors on the device will be active with the remaining mirrors in the "off" position. Analog images can also be displayed, but are first converted to digital form.

The memory cells below each mirror are electrostatically tilted to the "on" or "off" position, and are pulsewidth modulated to switch on and off more than 1000 times a second. The close spacing of the mirrors (approximately 1 $\mu$m) provides for seamless video images without distortion.

A display of present invention utilizes the optical image provided by the Texas Instruments' device described herein above, and with a few modifications such as brightness, passes the image through a distortion free lens that precisely projects the image onto a projection surface that is located in the same location that a conventional CRT screen would be mounted on a display of the same dimensions. The image projected is a directly viewed image, as is the image viewed on a conventional CRT display, as opposed to viewing a reflected image as can be the case utilizing the Texas Instruments' device in a conventional manner to project the image onto a remote projection screen.

The display of the present invention can be a direct replacement in size to a conventional CRT display. However, the magnetic electron beam deflection needed in the conventional CRT is not required in the present invention. Hence, displays of the present invention placed adjacent each other will not exhibit cross-talk interference as would conventional CRT displays.

As stated above, because displays of the present invention do not require a vacuum chamber, the displays of the present invention are much lighter in comparison with a conventional CRT display of comparable size.

In alternate configurations, the Texas Instruments device can be replaced in the present invention by a conventional FeLCD or LCD display.

Accordingly, it is an objective of the present invention to provide a direct view visual display that can display digital images without conversion to analog form.

It is a further objective of the present invention to provide a visual display that does not require a thick vacuum tube or envelope.

It is another objective of the present invention to provide a visual display that is not subject to cross-talk when multiple displays are placed adjacent one another.

It is still a further objective of the present invention to provide for using multiple visual displays adjacent one another that have a relatively small visual gap between adjacent displays, especially suitable for simulation.

It is yet another objective of the present invention to provide a 1:1 form, fit, and function replacement for a conventional CRT that is, in comparison, relatively lightweight and inexpensive, especially in a simulated display.

In accordance with these and other objects which will become apparent hereinafter, the instant invention will now be described with particular reference to the accompanying drawings.

DESCRIPTION OF THE PREFERRED EMBODIMENTS

Figure 1:
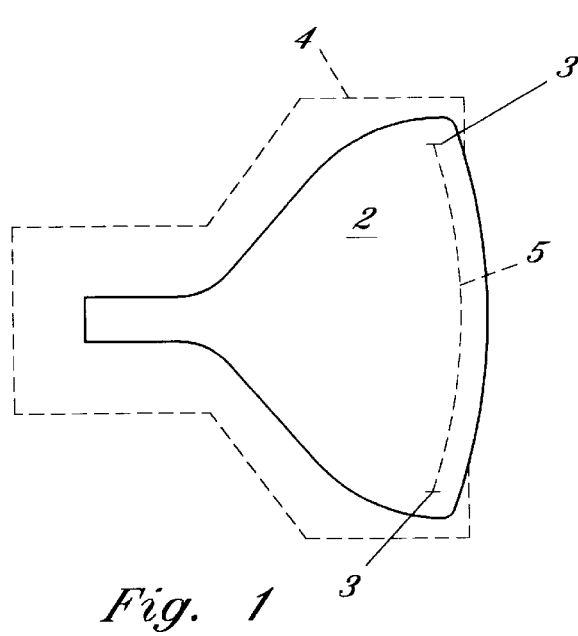
FIG. 1 is a side elevational view of a prior art CRT display.

Referring now to FIG. 1, a prior art cathode-ray tube (CRT) display is shown which includes CRT tube 2 in a housing 4. CRT tube 2 must provide for generation and deflecting of at least one electron beam that bombards and illuminates phosphor image surface 5 to create the desired image by known scanning techniques. CRT tube 2 must be a vacuum chamber, and consequently is thick and heavy. The edge region 3 around the image surface 5 cannot display an image due in part to the thickness of tube 2. This results in a gap between CRTs when multiple CRTs are placed adjacent to one another in a multi-CRT application.

Figure 2:
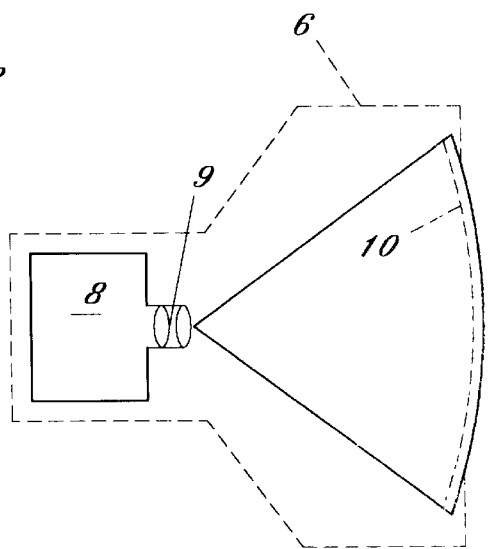
FIG. 2 is a side elevational view of the present invention.

Referring now to FIG. 2, the display of the present invention is shown in housing 6, and includes digital projection electronics 8, a focusing lens 9, and a projection surface 10. A vacuum tube is not required in the present invention therefore projection surface 10 can extend further to the perimeter of housing 6, and there is no edge region 3 as in the prior art CRT. Therefore, when a plurality of displays 6 are placed adjacent one another, the gap between adjacent displays is much smaller than the prior art displays 4 and can be approximately one half inch (½").

Because vacuum tube 2 of the prior art CRT is heavy, a large supportive framework is required to hold multiple displays 4 when used in an application that requires multiple displays. In contrast the displays 6 of the present invention are relatively light in weight and the corresponding framework necessary to hold a plurality of displays 6 will be much lighter and easier to construct.

Figure 3:
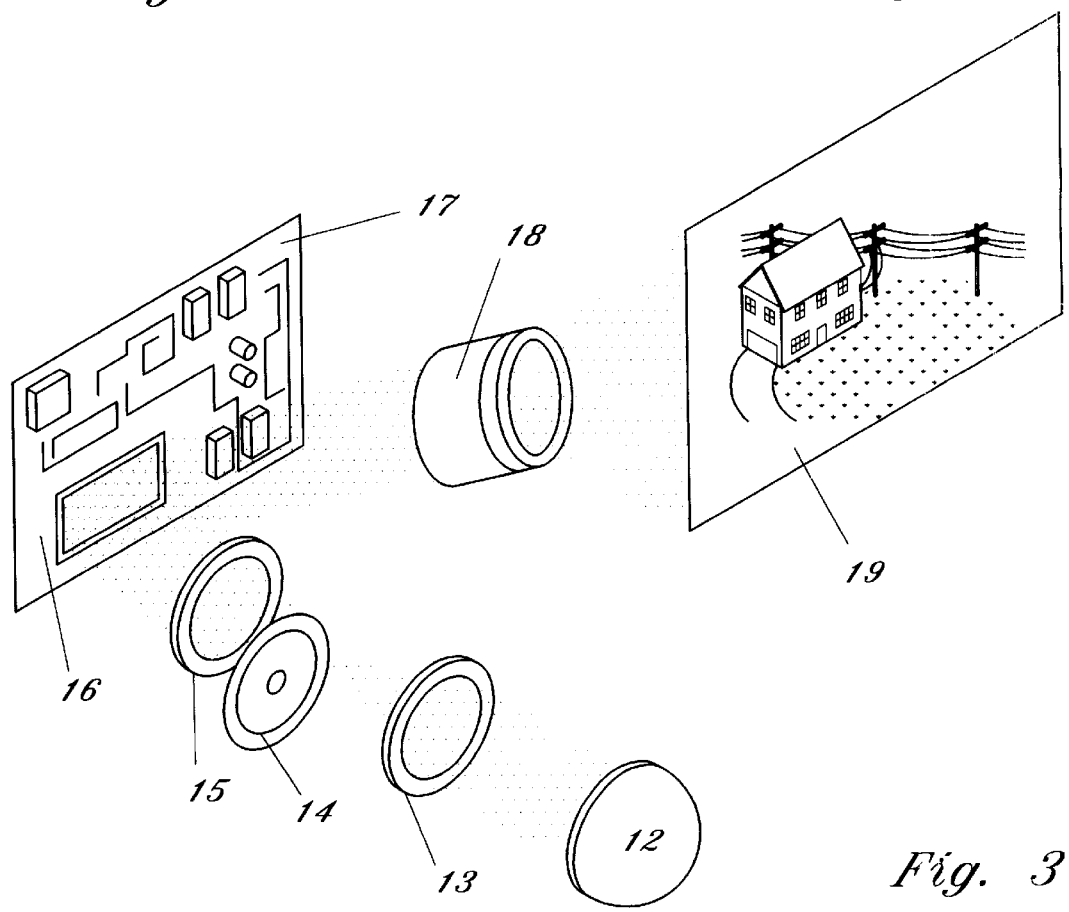
FIG. 3 is an exploded perspective view of the optics used in the present invention.

Referring now to FIG. 3, the optical portion of digital projection electronics 8 is shown. A light source 12 transmits light to condensing lens 13, through color filter 14, through lens 15 and onto a digital micromirror device 16, which is controlled by a digital light processing system 17 (fully described herein below), and back to a projection lens 18 and onto screen 19 for viewing.

The micromirror device 16, and the controlling electronics of the digital light processing system 17 is disclosed in U.S. Pat. Nos. 5,600,383, and 5,083,857 to Hornbeck, L. J., and can be obtained from Texas Instruments, Inc., Dallas, Tex. The description herein comprises a brief description of how the Texas Instruments' devices operate.

Figure 4:
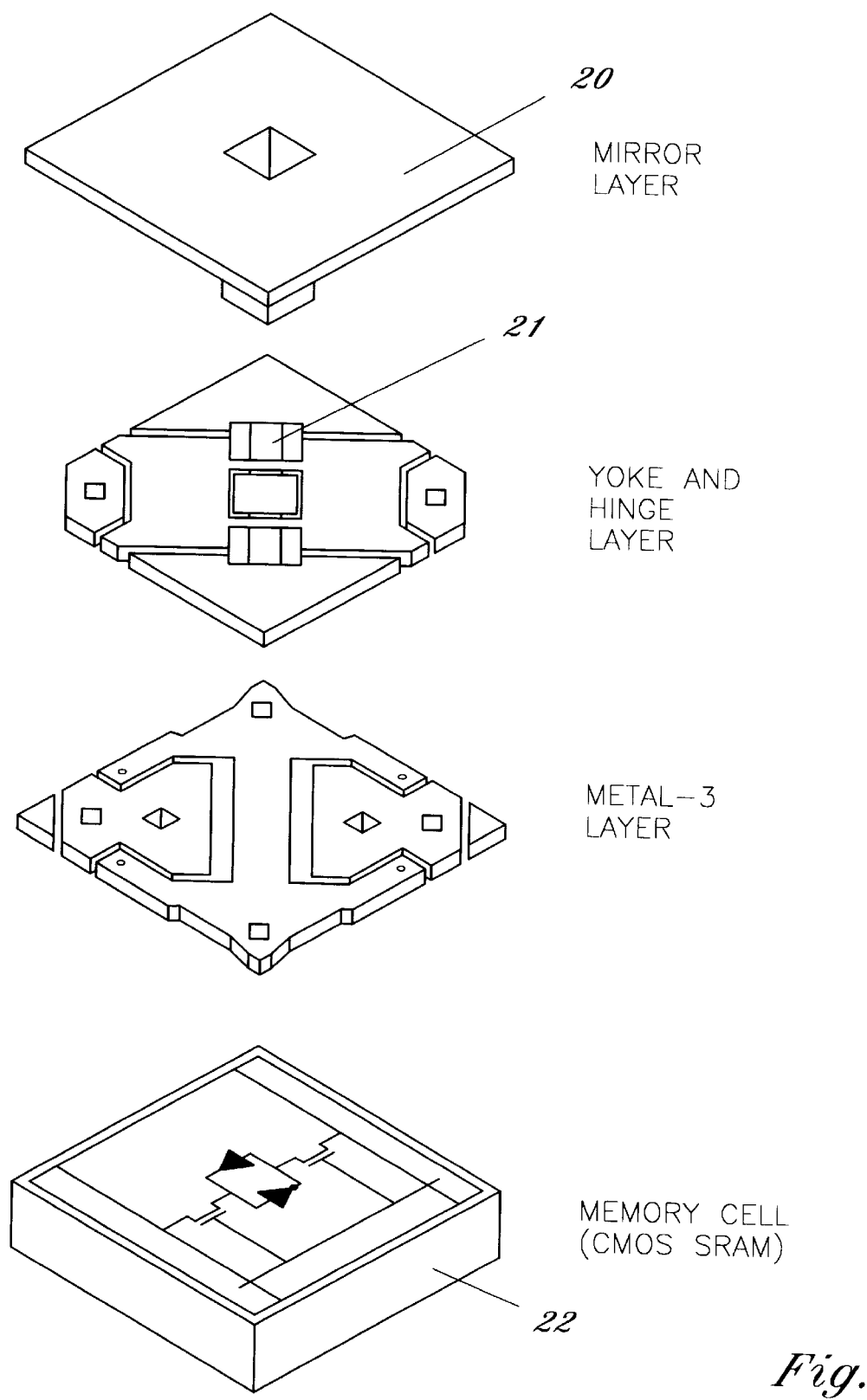
FIG. 4 is an exploded perspective view of one micromirror used in the present invention.

Referring now to FIG. 4, digital micromirror device 16 includes a plurality of micromirrors, which are made up of a small mirror 20 (approximately 16×16 $\mu$m) mounted by a hinge 21 to a semiconductor substrate forming a static random access memory (SRAM) 22. The hinges 21 allow for each mirror 20 to be tilted between +10 degrees and −10 degrees. Each mirror 20 can switch a pixel of light from an "on" state, when the mirror is at +10 degrees, to an "off" state, when the mirror is at −10 degrees.

Figure 5:
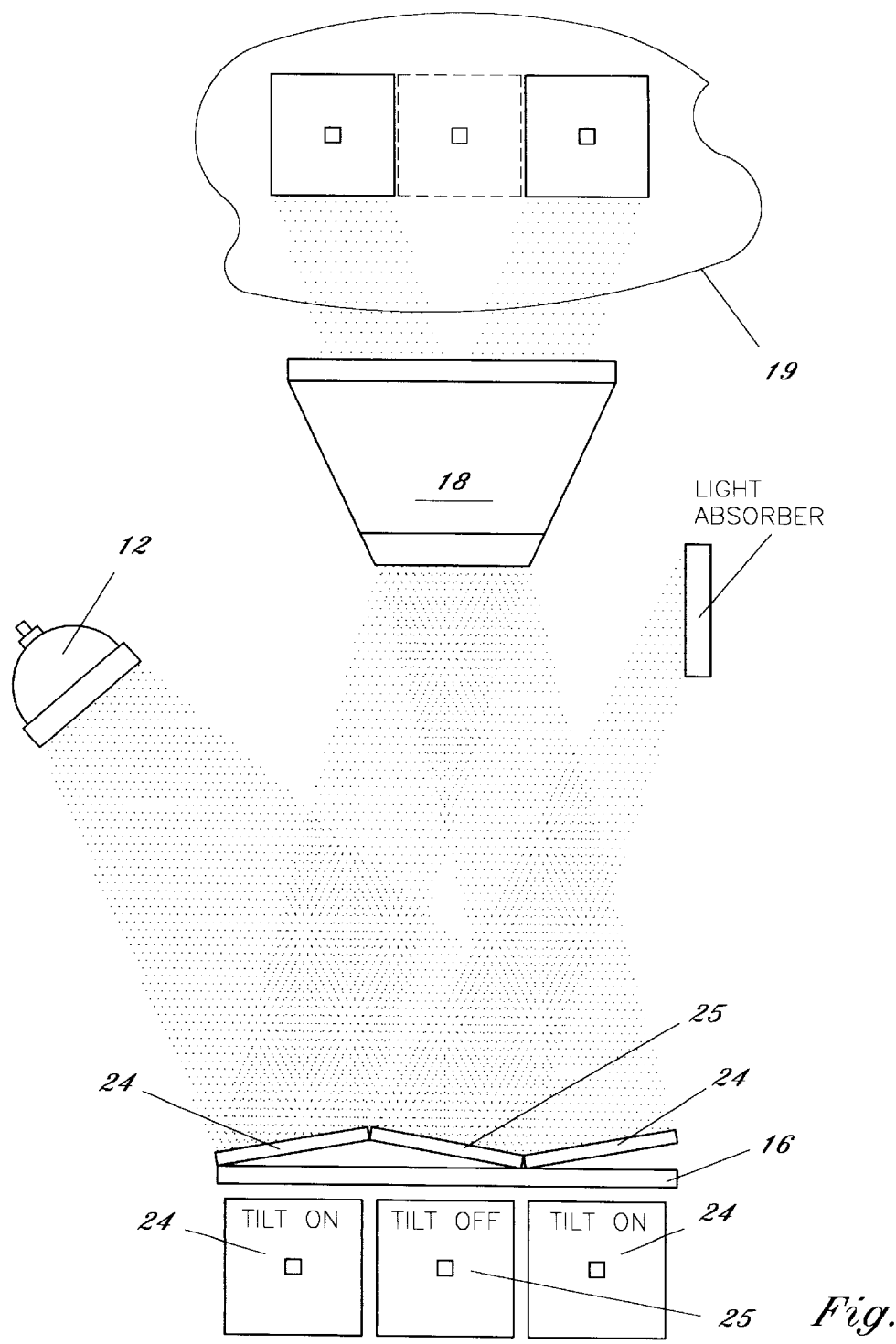
FIG. 5 is an exploded enlarged view of the micromirror of the present invention.

Referring also to FIG. 5, light, which may or may not be sent through condensing optics 13 and 15, and color filter 14, is reflected from the mirror surfaces 20 that are "on" 24, and typically pass through a projection lens 18 to be projected onto a remote screen 19 for viewing. The mirrors that are "off" 25 will not reflect light back through the projection lens.

A typical micromirror device 16 can have from 442,368 to 2.3 million mirrors, for example a standard 848×600 micromirror device will contain 508,800 tiltable mirrors.

Each pixel of digital image data is bit mapped in a 1:1 ratio directly to its own mirror providing exact digital control of the projected image. If the signal is 640×480 pixels, the central 640×480 mirrors on the device will be active with the remaining mirrors in the "off" position. Analog images can also be displayed, but are first converted to digital form.

The memory cells 22 below each mirror 20 are electrostatically tilted to the "on" or "off" position, and are pulse-width modulated to switch on and off more than 1000 times a second. The close spacing of the mirrors (approximately 1 $\mu$m) provides for seamless video images without distortion.

In the present invention, projection lens 18 in the Texas Instruments' device can be replaced by focusing lens 9, as shown in FIG. 2, to direct the image onto surface 10 by direct viewing thereon. Alternately, projection lens 18 is used in combination with focusing lens 9. The lens 9 provides distortion free projection of the digital image reflected from micromirror device 16 onto projection surface 10.

Because the display 6 of the present invention does not require magnetic beam deflecting electronics as is required in prior art display 4, electromagnetic cross-talk interference between adjacent displays 6, when used in a multiple display environment, is illuminated as compared to cross-talk interference for adjacent prior art displays 4 when being used in the same multiple display environment.

Alternately, the digital projection electronics 8 can be replaced by conventional FeLCD or LCD displays.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A light projection visual display system for use in simulation that replaces an existing cathode-ray tube visual display system that is lightweight and low cost while eliminating cross-talk interference previously existing with cathode-ray tube display systems comprising:

a lamp light source;

means for controlling light projected from said lamp for generating an image containing information;

means for providing a digital informational signal to said means for controlling said light;

back projection screen sized in area to fit and replace the screen area of the cathode-ray tube display system being replaced;

lens-array disposed between said back projection screen and said light control image-generating means for image modification;

whereby said lamp light source, said light control means, said screen and said lens-array are all mounted together in the space originally occupied by the cathode-ray tube system being replaced.

2. A display system as in claim 1, wherein:

said system includes a plurality of individual display devices mounted side-by-side in an array that replaces a series of CRT display systems mounted together.

* * * * *